United States Patent
Chuang et al.

(10) Patent No.: US 8,594,754 B2
(45) Date of Patent: Nov. 26, 2013

(54) ELECTRONIC DEVICE

(75) Inventors: I-Cheng Chuang, Taoyuan County (TW); Yao-Wen Yeh, Taoyuan County (TW); Yu-Huei Tsai, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 198 days.

(21) Appl. No.: 12/637,376

(22) Filed: Dec. 14, 2009

(65) Prior Publication Data
US 2010/0304802 A1 Dec. 2, 2010

(30) Foreign Application Priority Data
May 27, 2009 (TW) .............................. 98117701 A (51) Int. Cl.
*H04M 1/00* (2006.01)
(52) U.S. Cl.
USPC .................. 455/575.4; 455/575.1; 455/575.8; 455/566; 455/575.3; 455/90.3; 361/814; 361/679.05; 361/679.01
(58) Field of Classification Search
USPC .......... 455/575.1, 575.2, 575.3, 575.4, 575.8, 455/566, 90.3; 361/79.05, 679.01, 814, 361/679.05
See application file for complete search history.

(56) References Cited

U.S. PATENT DOCUMENTS

| | | | |
|---|---|---|---|
| 7,084,345 B1 | 8/2006 | Chen et al. | |
| 7,257,432 B2 | 8/2007 | Nan | |
| D559,222 S * | 1/2008 | Chen | D14/138 AA |
| 7,636,591 B2 * | 12/2009 | Kim et al. | 455/575.4 |
| 8,095,180 B2 * | 1/2012 | Lee et al. | 455/556.1 |
| 2005/0090298 A1 * | 4/2005 | Park et al. | 455/575.4 |
| 2005/0095995 A1 | 5/2005 | Bae | |
| 2005/0250536 A1 | 11/2005 | Nan | |
| 2005/0250563 A1 * | 11/2005 | Nan | 455/575.4 |
| 2006/0258302 A1 | 11/2006 | Ding et al. | |
| 2007/0142101 A1 * | 6/2007 | Seshagiri et al. | 455/575.4 |
| 2007/0153465 A1 * | 7/2007 | Shih et al. | 361/683 |
| 2008/0051161 A1 * | 2/2008 | Tashiro | 455/575.1 |
| 2008/0081505 A1 * | 4/2008 | Ou et al. | 439/374 |
| 2008/0261659 A1 * | 10/2008 | Jang et al. | 455/566 |
| 2008/0297991 A1 * | 12/2008 | Ou | 361/679 |
| 2009/0029741 A1 * | 1/2009 | Satou et al. | 455/566 |
| 2009/0036180 A1 * | 2/2009 | Ye | 455/575.4 |
| 2009/0103253 A1 * | 4/2009 | Yeh | 361/679.05 |

(Continued)

FOREIGN PATENT DOCUMENTS

| | | |
|---|---|---|
| CN | 1612682 A | 5/2005 |
| CN | 1976365 A | 6/2007 |

(Continued)

*Primary Examiner* — Temesgh Ghebretinsae
*Assistant Examiner* — Md Talukder
(74) *Attorney, Agent, or Firm* — Birch, Stewart, Kolasch & Birch, LLP (57) ABSTRACT

An electronic device is provided, including a first module, a second module movable relative to the first module, and an elastic component. The second module has a slot and a convex surface on opposite sides thereof, wherein a sliding portion of the first module is movably received in the slot. When the second module moves relative to the first module to a closed or open position, the sliding portion abuts a first or second end surface of the slot. The elastic component is disposed in the first module and has a retractable end portion contacting the convex surface. When the second module moves with respect to the first module, the end portion slides along the convex surface and exerts an elastic force on the second module.

9 Claims, 7 Drawing Sheets

(56) References Cited

U.S. PATENT DOCUMENTS

| | | | |
|---|---|---|---|
| 2009/0247247 A1* | 10/2009 | Jang | 455/575.4 |
| 2009/0264167 A1* | 10/2009 | Shi et al. | 455/575.4 |
| 2009/0325656 A1* | 12/2009 | Tang | 455/575.4 |
| 2010/0004027 A1* | 1/2010 | Jang et al. | 455/566 |
| 2010/0081470 A1* | 4/2010 | Lee et al. | 455/556.1 |
| 2010/0099467 A1* | 4/2010 | Lee | 455/575.4 |
| 2010/0113100 A1* | 5/2010 | Harmon et al. | 455/566 |
| 2010/0124001 A1* | 5/2010 | Zhou et al. | 361/679.01 |
| 2010/0151924 A1* | 6/2010 | Amano | 455/575.4 |
| 2010/0304802 A1* | 12/2010 | Chuang et al. | 455/575.4 |
| 2011/0009170 A1* | 1/2011 | Xiao | 455/566 |
| 2011/0051330 A1* | 3/2011 | Lee et al. | 361/679.01 |
| 2011/0051380 A1* | 3/2011 | Park | 361/749 |
| 2012/0094725 A1* | 4/2012 | Matsumoto | 455/566 |

FOREIGN PATENT DOCUMENTS

| | | |
|---|---|---|
| EP | 1528755 A1 | 5/2005 |
| EP | 1528761 A2 | 5/2005 |
| TW | I280832 | 5/2007 |
| TW | 200823379 A | 6/2008 |

* cited by examiner

ELECTRONIC DEVICE

CROSS REFERENCE TO RELATED APPLICATIONS

This Application claims priority of Taiwan Patent Application No. 098117701, filed on May 27, 2009, the entirety of which is incorporated by reference herein.

BACKGROUND OF THE INVENTION

1. Field of the Invention

This application relates in general to an electronic device and in particular to a sliding-type electronic device.

2. Description of the Related Art

Figure 1:
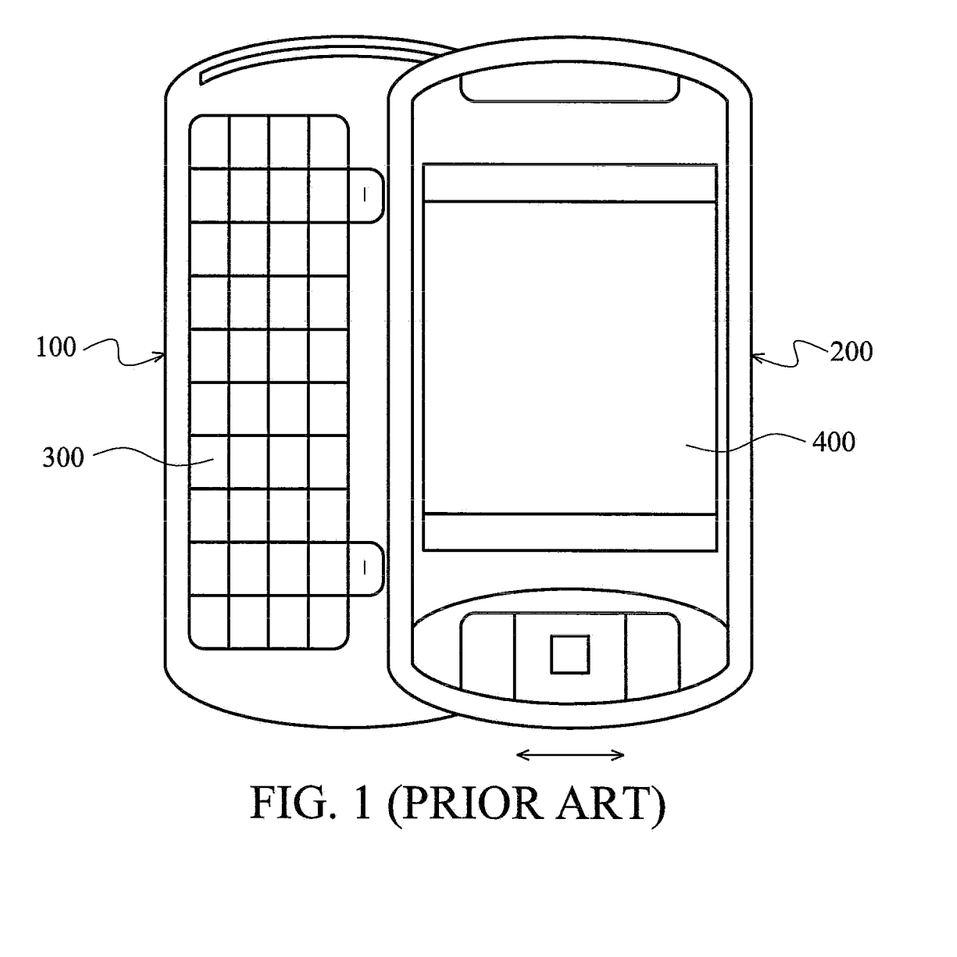
FIG. 1 is a perspective diagram of a conventional sliding-type electronic device.

FIG. 1 depicts a conventional sliding-type electronic device, such as a mobile phone or PDA, including an input module 100 and a display module 200 reciprocally movable with respect to each other (as the arrows indicate in FIG. 1), wherein the input module 100 includes a keypad 300, and the display module 200 includes a screen 400.

The input module 100 and the display module 200 are usually connected via a sliding hinge to facilitate semi-auto sliding therebetween. As the sliding hinge has considerable dimensions, miniaturization of the electronic device is not easy to achieve.

BRIEF SUMMARY OF INVENTION

The application provides an electronic device including a first module, a second module movable relative to the first module, and an elastic component. The second module has a slot and a convex surface on opposite sides thereof, wherein a sliding portion of the first module is movably received in the slot. When the second module moves relative to the first module to a closed or open position, the sliding portion abuts a first or second end surface of the slot. The elastic component is disposed in the first module and has a retractable end portion contacting the convex surface. When the second module moves with respect to the first module, the end portion slides along the convex surface and exerts an elastic force on the second module.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 2:
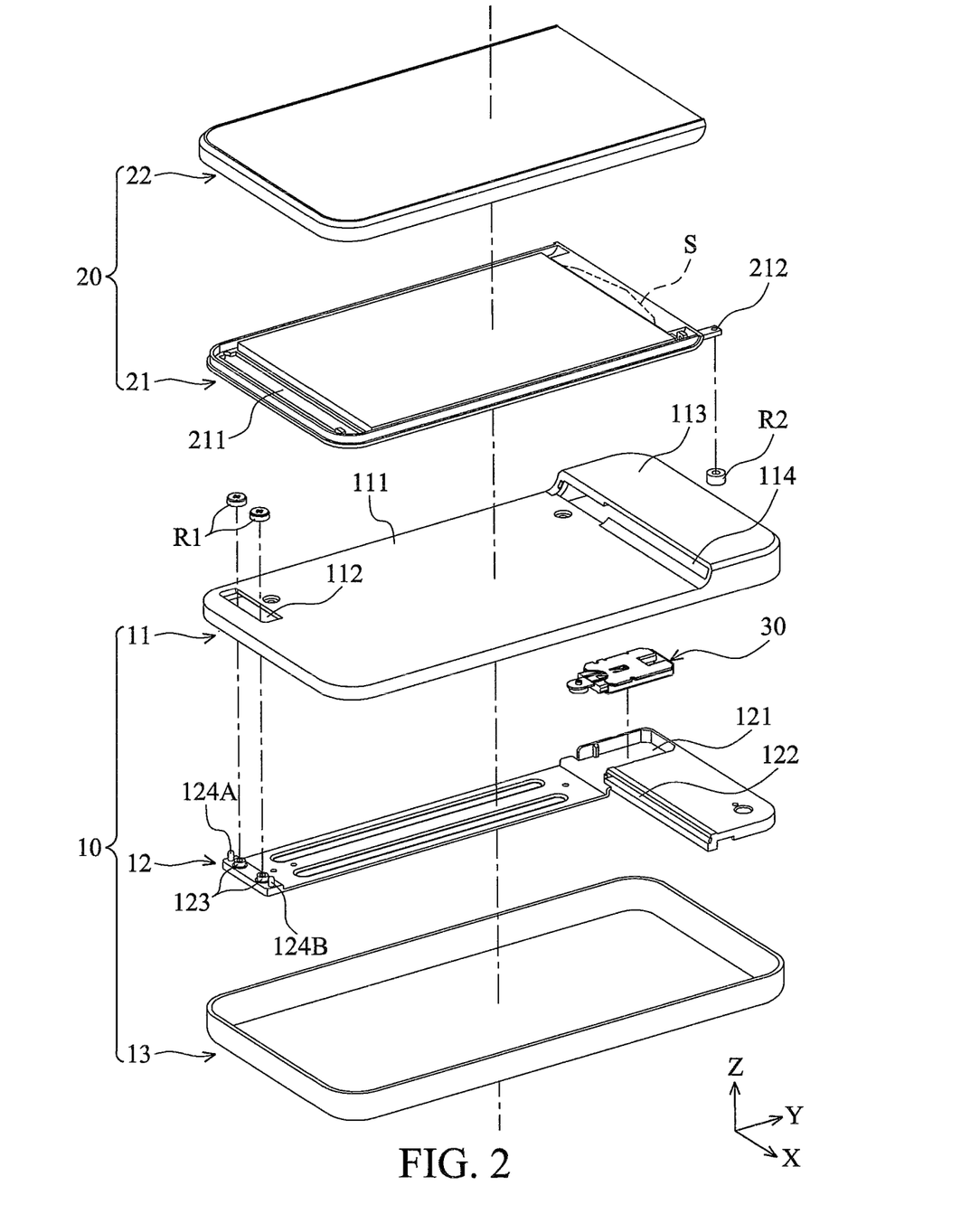
FIG. 2 is an exploded diagram of an electronic device according to an embodiment of the invention.
Figure 3:
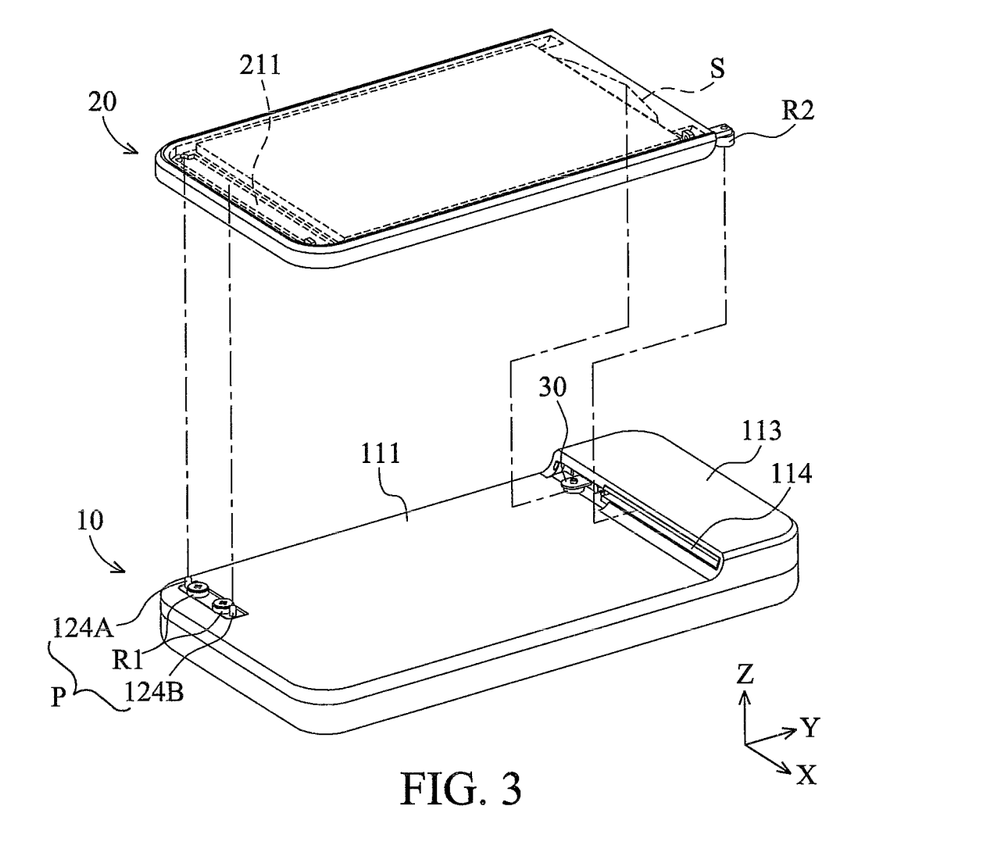
FIG. 3 is a perspective diagram of the electronic device of FIG. 2.

Referring to FIGS. 2 and 3, an embodiment of an electronic device includes a first module 10, a second module 20, and a elastic component 30, wherein the first module 10 may be an input module including a keypad, and the second module 20 may be a display module including a screen. In this embodiment, the second module 20 is slidable with respect to the first module 10 along a first direction (X axis). The elastic component 30 is disposed on the first module 10 and contacts a convex surface S of the second module 20. The elastic component 30 can exert an elastic force on the second module 20 to facilitate semi-auto sliding between the first and second modules 10 and 20.

The electronic device of the embodiment may be a mobile phone, PDA, Ultra-Mobile PC (UMPC), or tablet PC. In this embodiment, the sliding-type electronic device is slidable along the horizontal direction (X axis). However, the embodiment can also be applied to an electronic device which includes a second module 20 slidable with respect to a first member 10 along the vertical direction (Y axis).

Referring to FIG. 2, the first module 10 includes a first member 11, a fixed frame 12, and a lower casing 13 fixed to the first member 11. The fixed frame 12 is L-shaped and secured between the first member 11 and the lower casing 13. The second module 20 includes a second member 21 and an upper casing 22 fixed to the second member 21. As shown in FIG. 2, the second member 21 is disposed adjacent to a main surface 111 of the first member 11, wherein an elongated slot 211 is formed on a side of the second member 21 and parallel to the X axis. Additionally, a convex surface S is formed on another side of the second member 21, opposite to the slot 211. The elastic component 30 is accommodated in a recess 121 of the fixed frame 12 and contacts the convex surface S, as shown in FIG. 3.

The fixed frame 12 has a first pin 124A, a second pin 124B, and two nubs 123 between the first and second pins 124A and 124B. In this embodiment, two round first sliders R1 are respectively connected to the nubs 123. During assembly, the first sliders R1 and the first and second pins 124A and 124B are extended through an opening 112 of the first member 11 and received in the slot 211 of the second member 21, as shown in FIG. 3. Specifically, the first sliders R1 and the first and second pins 124A and 124B include a sliding portion P stably sliding along the slot 211 when the second module 20 moves relative to the first module 10 along the X axis.

As shown in FIG. 2, the second member 21 has an extension portion 212 with a round second slider R2 disposed thereon. During assembly, the extension portion 212 and the second slider R2 are extended through an opening 114 of the first member 11 and accommodated in a receiving portion 113 thereof. Additionally, the second slider R2 contacts a rail 122 on the fixed frame 12, wherein when the second module 20 moves relative to the first module 10 along the X axis, the second slider R2 slides along the rail 122, as shown in FIGS. 4-6.

Referring to FIG. 3, the receiving portion 113 is located beside the second module 20 and protrudes from the main surface 111 along the z direction. Furthermore, the elastic component 30 is accommodated in the receiving portion 113, wherein an end portion of the elastic component 30 is extended from the receiving portion 113 to the second module 20 and contacts the convex surface S.

Figure 4:
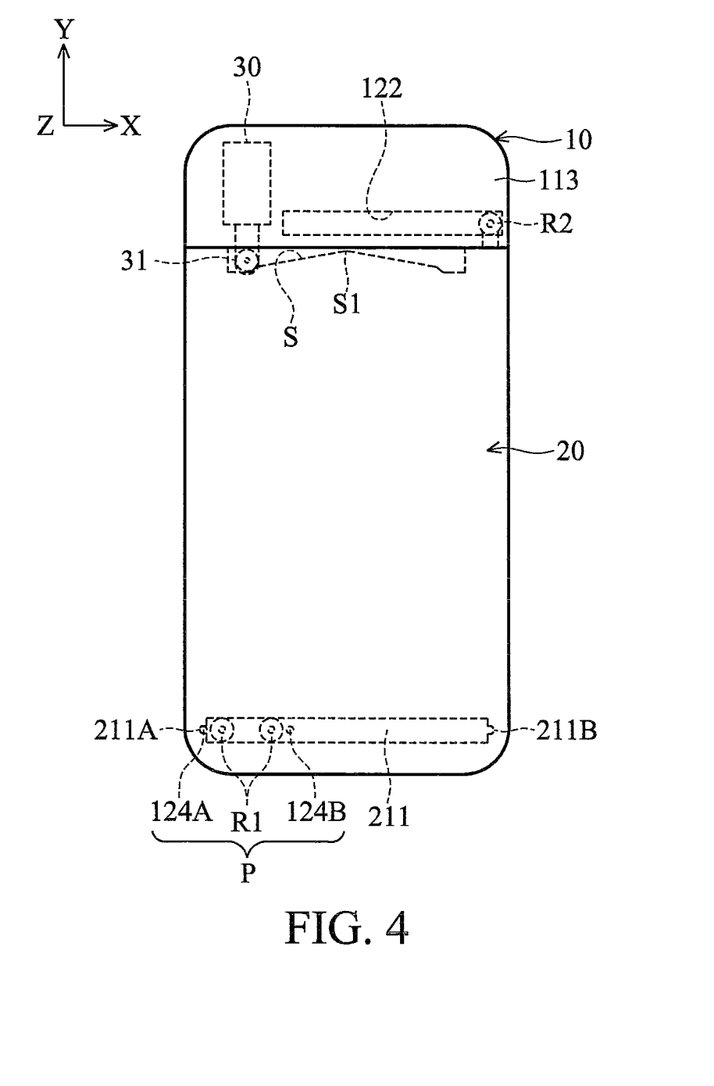
FIG. 4 is a perspective diagram showing a second module situated in a closed position according to an embodiment of the invention.

Referring to FIG. 4, when the second module 20 is situated in a closed position relative to the first module 10, the main surface 111 is covered by the second module 20, and the first pin 124A of the first module 10 abuts a first end surface 211A of the slot 211. Hence, the second module 20 cannot further move to the right relative to the first module 10, so as to restrict the second module 20 in the closed position.

Figure 5:
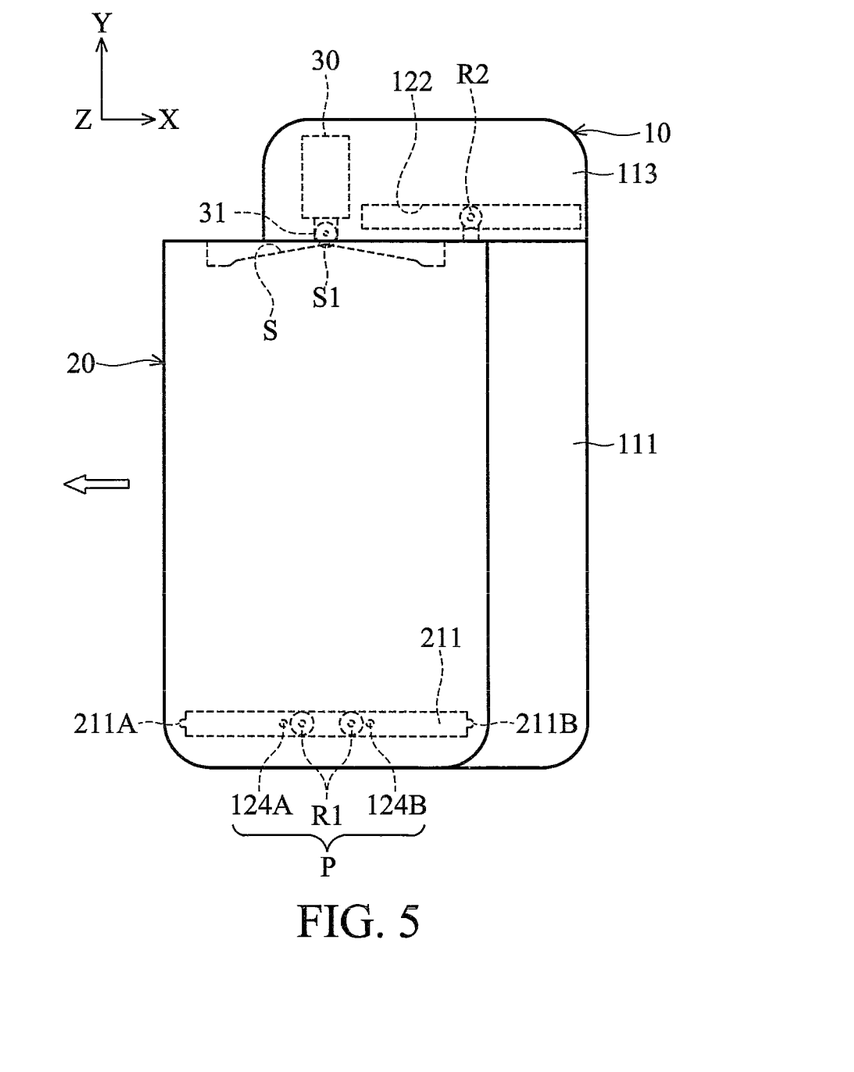
FIG. 5 is a perspective diagram showing a second module sliding relative to a first module according to an embodiment of the invention.
Figure 6:
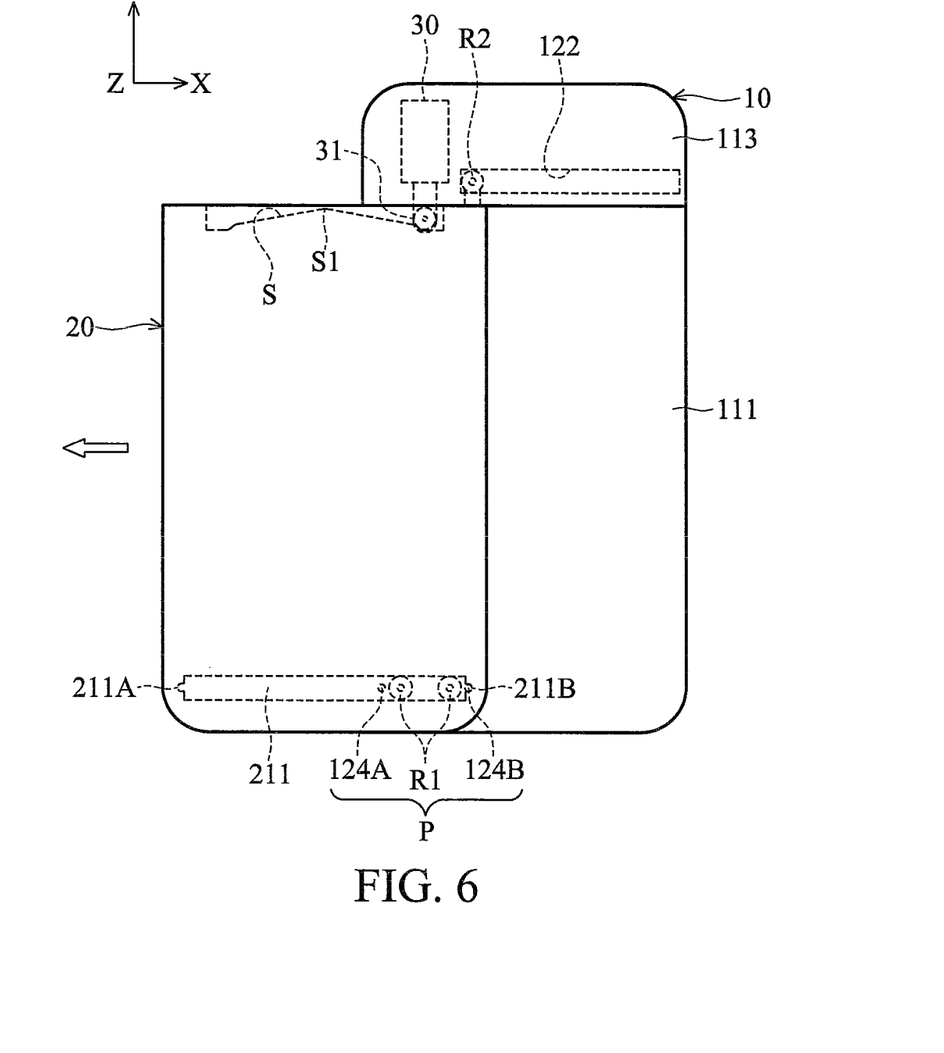
FIG. 6 is a perspective diagram showing a second module situated in an open position according to an embodiment of the invention.

As shown in FIG. 5, the second module 20 can be moved to an open position relative to the first module 10 by an external force along the −X direction. When the second module 20 is pushed to the left, as the arrow indicates in FIG. 5, the sliding potion P of the first module 10 slides along the slot 211, and the second slider R2 of the second module 20 slides along the rail 122 in the receiving portion 113.

During sliding of the second module 20 relative to the first module 10 along the −X direction, an end portion 31 of the elastic component 30 is pressed and retracted by the convex surface S along the Y direction, as shown in FIG. 5. Thus, the elastic component 30 can exert an elastic force on the second module 20. In this embodiment, the elastic component 30 may include a compression spring, and the end portion 31 may include a roller or a contact pin for contacting the convex surface S. When the end portion 31 of the elastic component 30 slides along the convex surface S and exceeds a critical position S1, the second module 20 can be automatically forced forward by the elastic force from the elastic component 30 to an open position, as shown in FIG. 6.

Referring to FIG. 6, when the second module 20 is forced to the open position, the second pin 124B of the first module 10 abuts a second end surface 211E of the slot 211. Hence, the second module 20 cannot further move to the left relative to the first module 10, so as to restrict the second module 20 in the open position. In some embodiments, the first and second pins 124A and 124B can be omitted, and the second module 20 can be restricted within a limited position by the rollers R1 abutting the first end surface 211A or the second end surface 211B.

Figure 7:
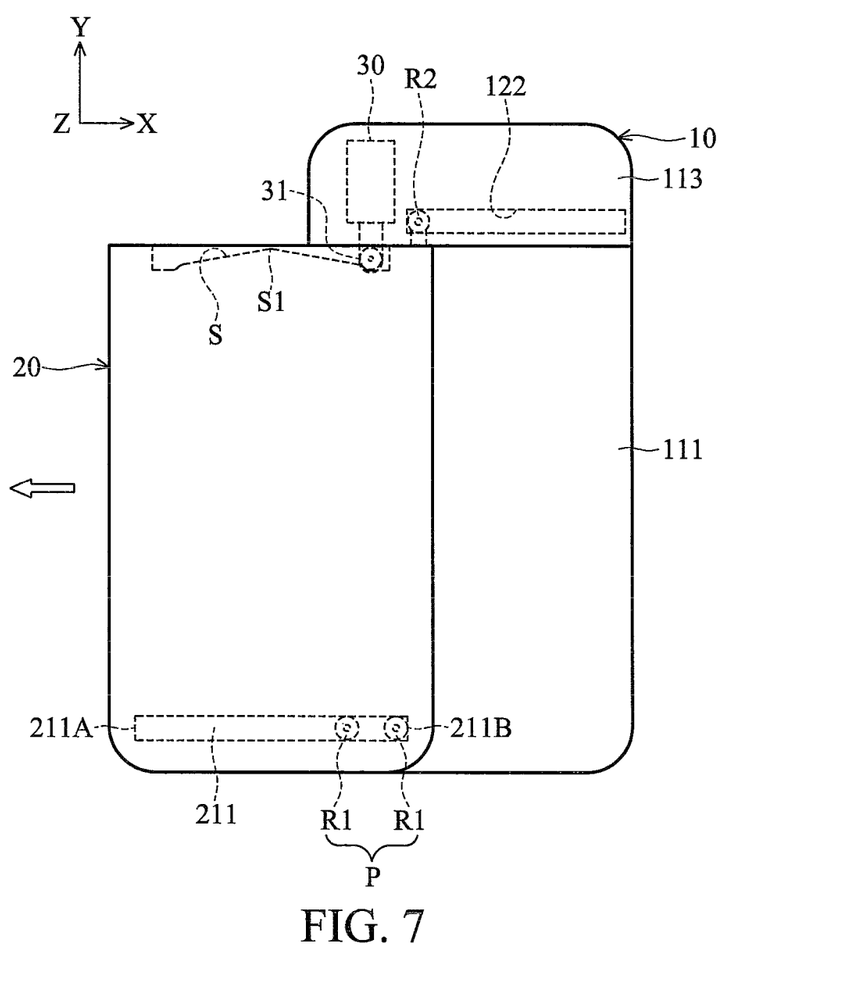
FIG. 7 is a perspective diagram of an electronic device according to another embodiment of the invention.

The first and second end surfaces 211A and 211B in this embodiment respectively form a curved recess, corresponding to the curved profile of the first and second pins 124A and 124B for positioning. As shown in FIG. 7, another embodiment of the sliding portion P may include only one or two sliders R1, wherein when the second module 20 moves to the closed or open position relative to the first module 10, the roller R1 directly abuts the first end surface 211A or the second end surface 211B to restrict the second module 20 in the closed or open position.

The application provides an electronic device capable of semi-auto sliding. The electronic device includes a first module and a second module with a sliding portion and a slot respectfully disposed thereon. When the second module moves to a limit position (such as closed or open position) relative to the first module, the sliding portion abuts an end surface of the slot to restrict the second module in the limit position. Specifically, an elastic component for semi-auto sliding is accommodated in a receiving portion outside the second module. As the elastic component does not occupy the overlap area of the first and second module, thickness can be reduced to facilitate miniaturization of the electronic device.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
a first module, comprising a sliding portion and a first member, wherein the first member has a main surface and a receiving portion protruding from the main surface, and the sliding portion projects from the main surface;
a second module, adjacent to the main surface and the receiving portion, and movable with respect to the first module along a straight line between a closed position and an opened position, comprising a slot and a convex surface disposed on a side of the second module, wherein the side is adjacent to the receiving portion, wherein the sliding portion is movably received in the slot, the sliding portion contacts a first end surface of the slot when the second module moves relative to the first module to the closed position, and the sliding portion contacts a second end surface of the slot when the second module moves relative to the first module to the open position; and
a resilient member accommodated in the receiving portion, comprising a retractable end portion abutting the convex surface, wherein when the second module moves relative to the first module along the straight line, the end portion moves along the convex surface and exerts an elastic force on the second module.

2. The electronic device as claimed in claim 1, wherein the resilient member and the second module are disposed side by side.

3. The electronic device as claimed in claim 1, wherein the second module further comprises a second member and an upper casing fixed to the second member, wherein the second member is adjacent to the first module, and the slot and the convex surface are formed on the second member.

4. The electronic device as claimed in claim 1, wherein the sliding portion comprises a first slider contacting the first end surface when the second module moves relative to the first module to the closed position, and the first slider contacts the second end surface when the second module moves relative to the first module to the open position.

5. The electronic device as claimed in claim 1, wherein the sliding portion comprises a first pin, a second pin, and a first slider disposed therebetween, and the first pin contacts the first end surface when the second module moves relative to the first module to the closed position, and the first pin contacts the second end surface when the second module moves relative to the first module to the open position.

6. The electronic device as claimed in claim 5, wherein the first and second end surfaces respectively form a curved recess corresponding to the first and second pins.

7. The electronic device as claimed in claim 1, wherein the first module further comprises a fixed frame fixed to the first member, and the sliding portion is disposed on the fixed frame.

8. The electronic device as claimed in claim 7, wherein the first module further comprises a lower casing fixed to the first member, and the fixed frame is secured between the first member and the lower casing.

9. The electronic device as claimed in claim 1, wherein the first module further comprises a rail disposed in the receiving portion, and the second module further comprises a second slider sliding along the rail when the second module moves relative to the first module.

* * * * *